United States Patent [19]

Högseth

[11] Patent Number: 5,078,590
[45] Date of Patent: Jan. 7, 1992

[54] MOLD CLAMPING DEVICE FOR AN INJECTION MOLDING MACHINE

[75] Inventor: Kjell Högseth, Raufoss, Norway

[73] Assignee: Klöckner Ferromatik Desma GmbH, Malterdingen, Fed. Rep. of Germany

[21] Appl. No.: 589,806

[22] Filed: Sep. 28, 1990

[30] Foreign Application Priority Data

Oct. 6, 1989 [DE] Fed. Rep. of Germany ....... 3933348

[51] Int. Cl.$^5$ .............................................. B29C 45/66
[52] U.S. Cl. .................. 425/589; 425/451.9; 425/595
[58] Field of Search ............ 425/589, 595, 451.9, 425/444, DIG. 221

[56] References Cited

U.S. PATENT DOCUMENTS 4,797,086  1/1989  Adachi ................................ 425/589

FOREIGN PATENT DOCUMENTS

| | | |
|---|---|---|
| 806170 | 6/1951 | Fed. Rep. of Germany ...... 425/589 |
| 1729314 | 8/1967 | Fed. Rep. of Germany . |
| 2020880 | 4/1970 | Fed. Rep. of Germany . |
| 2102725 | 1/1971 | Fed. Rep. of Germany . |
| 3434863A1 | 9/1984 | Fed. Rep. of Germany . |
| 3715160A1 | 5/1987 | Fed. Rep. of Germany . |
| 52-2412 | 1/1977 | Japan .................................. 425/451.9 |

*Primary Examiner*—Timothy Heitbrink
*Attorney, Agent, or Firm*—Watson, Cole, Grindle & Watson

[57] ABSTRACT

A mold clamping device is provided for an injection molding machine having a stationary mold half and a movable mold half supported by a movable plate. A drive rod is connected at one end to this movable plate and is received at the other end by a driving ring piston having at least one recess within its inner shell. At least one coupling member such as a split flap is swivably connected to the other end of the rod. A suitable actuator such as a piston driven lever arm is provided to operatingly engage the coupling member with the recess, whereby the mold is clamped.

28 Claims, 6 Drawing Sheets

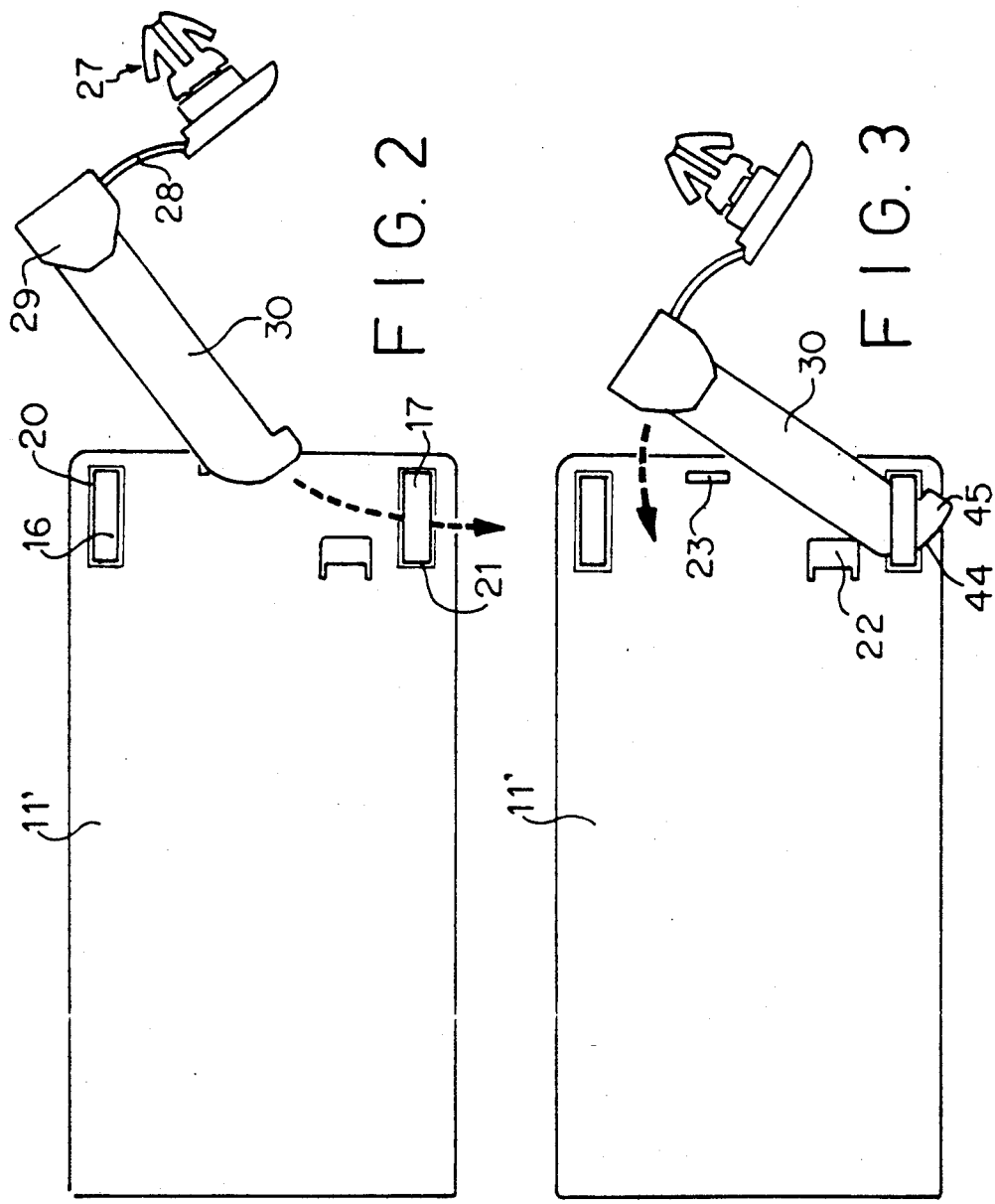

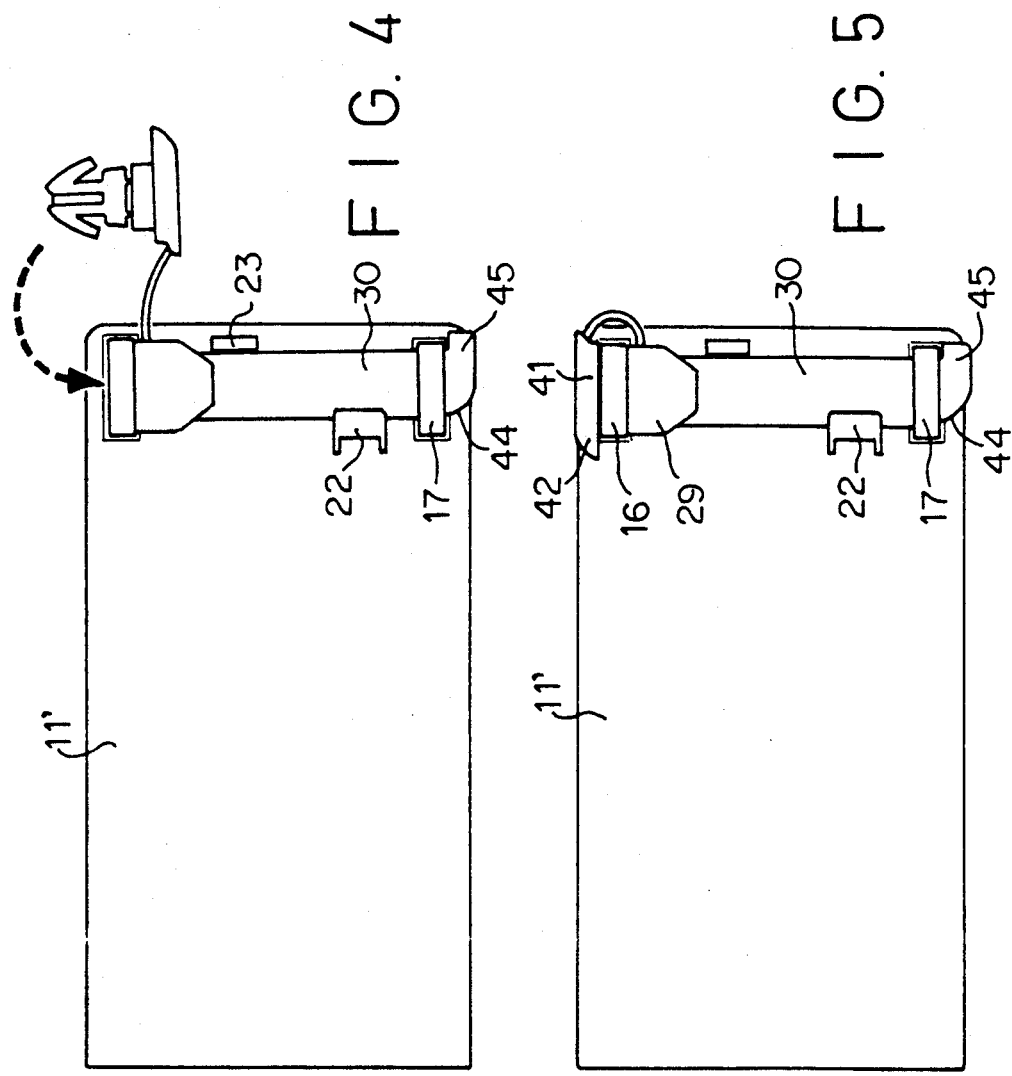

MOLD CLAMPING DEVICE FOR AN INJECTION MOLDING MACHINE

BACKGROUND OF THE INVENTION

1. Technical Field of the Invention

The present invention relates to a mold clamping device for an injection molding machine with at least one injection mold wherein a first injection mold half is supported by a first stationary mold plate and a second injection mold half is displaceable via a mold carrier that can be moved on at least two tie bars between the first stationary plate and a second stationary plate by means of at least a long-stroke drive cylinder-piston unit for rapid opening and closing of the injection mold halves, and the respective injection mold halves are closeable under high pressure by means of a short-stroke pressure pad device. Coupling bolts are provided that can be moved radially with respect to the longitudinal axis of the press plunger of the pressure pad device.

2. Discussion of the Related Art

Devices for moving a highly loadable punch in succession are known and include, for example, a clamping unit for plastic injection molding machines or a hydraulic press which enable the punch to move over a segment of its path at a high speed with low feeding power or at a low speed with high feeding power. To drive the punches of hydraulic presses, stepped pistons have often been used whose entire stroke is subdivided between a feed in rapid traverse by loading only the small piston surface or with a slower feed, and an increased press force out upon loading the entire piston surface. To actuate the clamping unit for plastic injection molding machines, elbow lever drives are velocity, the elbow lever is automatically driven and brings about a significant increase in the clamping force acting on the punch with the approach of the elbow levers at the extended position. The major drawbacks of such an elbow drive for the punches are that the final position of the tool carrying surface must be accurately adjusted for each mold and the punch stroke for a design-defined length of the elbow levers can be changed only within a very limited range.

To simplify this device, it has been proposed in West German patent application DE-OS 17 29 314 to provide, in addition to hydraulic working cylinders with a large stroke and small cross section for the rapid power traverse of the punch in the working and return direction, a support rod that is connected to a punch via another hydraulic working cylinder having a large cross section and small stroke and that is guided in a fixed abutment during rapid power traverse. Just before setting the punch, starting from which an increase in the feeding power is necessary to close the injection mold, the locking device, which was open up to this instant to enable a powerless comovement of the support rod for the punch, is closed between the support rod and the fixed abutment. Immediately thereafter, the working cylinder between the support rod and the punch having a large piston cross section is loaded with pressure fluid so that on its terminal path portion, which constitutes a very short fraction of its total path, the punch is moved into its end position with a significantly increased feeding power and at a correspondingly reduced velocity. As an embodiment for the locking device, at least two jaws that can be moved at the abutment in the radial direction with respect to the support rod are disclosed. These jaws interact with preferably several grooves that are uniformly spaced on the support rod and extend at right angles to the longitudinal direction of the support rod. A drawback of this device lies in the long reversing periods for the pressure medium.

In the West German patent application DE-AS 20 20 88, a mold clamping device of this type is described in which a pressure spindle, which can be moved into a bore of the press plunger, is attached to the movable mold carrier in order to transfer power. To couple the power mechanically between the squeezing stroke piston and the pressure spindle, two pressure ring halves are moved into position so that their cone-shaped face abuts against a correspondingly designed truncated cone-shaped contact surface at the face side of the pressure spindle. In this manner power essure spindle.

It has also already been proposed to clamp together the mold platens directly via the locking tie bars. To this end there are four hollow-bored lacing tie bars in whose bores extend auxiliary pistons for the closing and opening movement. As soon as the tie bars are moved into position and the mold is moved into the closed position, a mechanical locking that mates in the ring-shaped grooves of the tie bars is hydraulically actuated. The locking elements acting at this stage as pistons are hydraulically loaded with high pressure via intermediate rings acting as pressure pads and clamp the tie bars with the generation of the mold locking force.

In West German patent application DE-OS 21 02 725, in order to minimize the technical complexity it is proposed to provide the respective locking device with locking wedge surfaces which can be locked with a clamping pressure that simultaneously generates the closing and locking force in one working step with the locking mechanism. This method has the advantage that the locking tie bars can be solid. They are provided with a thread by means of which they can be adjusted longitudinally with respect to their mold platen via the tightening nuts. On their free end the locking tie bars have ring-shaped grooves which interact with the locking devices of the stationary mold platen, e.g., wedges. In this example, the locking device would have locking wedge surfaces which can be locked with the clamping pressure that simultaneously generates the closing and locking force in one working with the locking mechanism. Of course, the clamping forces that are hereby generated are relatively low.

West German patent application DE-OS 34 34 863 discloses a closing mechanism of an injection molding machine having a hydraulically driven cylinder-piston unit, which performs two substrokes of which the first is traversed faster than the second. A displacement pipe projects axially into the cylinder chamber and the piston, is attached to one face wall of the cylinder, and is open on the driven-out end of the displacement area. To keep the flow cross section for the post-suction lines small and to be able to omit an oil tank above the cylinder, it is proposed that the piston, whose stroke remains constant regardless of the height of the injection mold, actuate an elbow lever mechanism, and that the maximum overlapping length of the displacement area of the displacement pipe with the piston corresponds to the first substroke of the piston. The displacement pipe is then attached to a suction valve of an oil tank or the like.

In addition, West German patent application DE-OS 37 15 160 discloses that the closing force to be generated and corresponding to the selected cavity pressure is generated by means of an electromagnet, which exerts a mold-oriented force on the ram in a current-driven state.

Accordingly, it is an object of the present invention to simplify the design of the aforementioned mold locking device.

It is another object of the present invention to improve the aforementioned mold locking device such that the cycle periods of the molding sequences and the energies expended in closing and opening the injection mold halves are minimized.

Additional objects and advantages of the present invention are apparent from the specification and drawings which follow.

SUMMARY OF THE INVENTION

The foregoing and additional objects are obtained by the features of the present invention which comprise coupling bolts engaging appropriate recesses of a shell of the pressure pad piston upon completion of the first rapid closing movement shortly before the actual squeezing operation. The advantage of this mold locking device lies in the fact that two separate hydraulic cycles can be used for the fast long stroke and for the squeezing or opening stroke with suitably reduced quantities of oil. In this manner the reversing periods which were previously necessary are significantly reduced. The device of the invention is quite suitable for standardized substructures and results in a more cost-effective device with minimized, simplified hydraulics. The mold locking device of the invention also facilitates assembly, moving into position, disassembly and reassembly. The mold locking device can be used both for machines with a very long stroke and in designs with stack mold or tandem machines. The reduced cavity volume of the hydraulic oil has an especially drastic effect, which is of particular importance with respect to the reversing periods and the energy to be expended from time to time. Since the system of the invention does not have any mechanical locking and unlocking delays, up to 5 seconds per cycle can be saved. In a corresponding manner the control and regulating devices—such as pumps for hydraulic medium, seals, etc.—are also decreased.

Both bolts or spreading elements that can be moved out of position in a rotationally symmetrical arrangement can be used as the coupling bolts. Spreading elements in the form of split flaps hinges to the rod, whose rear faces can be loaded with the squeezing stroke force of the piston, have withstood test conditions especially well, wherein the force can be transferred via the front face of the swung-out split flap to a suitably designed counter surface of the rod. The angle of spread of the split flaps ranges preferably from 10° to 30°, and preferably from 10° to 20°. The front faces of the split flap are chamfered to match this spread angle.

To be able to carry out the return stroke with a minimum of complexity in design, the rod also has a ring-shaped shoulder over whose face the return stroke or opening force of the pressure pad piston can be transferred. The pressure pad device preferably has a ring-shaped piston collar which divides the cylinder chamber of the pressure pad into two parts which can be loaded alternately with a pressure medium for the squeezing or return stroke of the piston.

If the coupling bolts such as the split flaps have a slight axial play with respect to the recesses of the piston inner shell, only small forces are required to swing the flaps in or out since they can be easily moved into the recesses without any friction.

The split flaps can be actuated via a hinged lever arm. According to one embodiment of the invention, each hinged lever arm is hinged at one end to a split flap and at the other end to an axially moveable piston. This feature can be realized via swiveling bolts. With this design all of the split flaps can be actuated via one single piston. This piston can project with its free end through the cover of the rod housing and thereby serve as the position indicator for setting the split flaps.

For manufacturing reasons, the recess for the split flaps may be designed as an annular T-slot. Thus, problems with adjusting the rod with respect to the piston of the pressure pad are also eliminated. Preferably six equidistant split flaps are used that can be actuated electromechanically, pneumatically or hydraulically.

According to another embodiment of the invention, the rod is guided in a sliding sleeve of the pressure pad piston which can be made, for example, of a self-lubricating material.

In particular, the rod is to be designed so as to be adjustable in length. This feature can be realized by designing the rod on its end facing the movable plate as a sleeve with an internal thread with receives an adjusting screw that is connected to the moveable mold carrier. The external thread of the adjusting screw in turn engages with a worm gear of a hydraulic motor flanged to the movable plate. Furthermore, the movable plate receives a fixed inner shaft as an aligning element, which is arranged concentrically to the adjusting screw and the rod and is held in bearing sleeves of the rod, the adjusting screw and the moveable plate. To ensure against rotational movement of the rod, the rod is held securely with an inner shaft via a connection with a wedge-shaped groove.

To minimize the squeezing stroke, it is provided that the piston stroke of pressure pad is at most 20 cm. or in particular ranges from 10 to 15 cm.

BRIEF DESCRIPTION OF THE DRAWINGS

The embodiments of the invention are shown in the drawings, wherein.

DETAILED DESCRIPTION OF THE PREFERRED EMBODIMENTS

Figure 1:
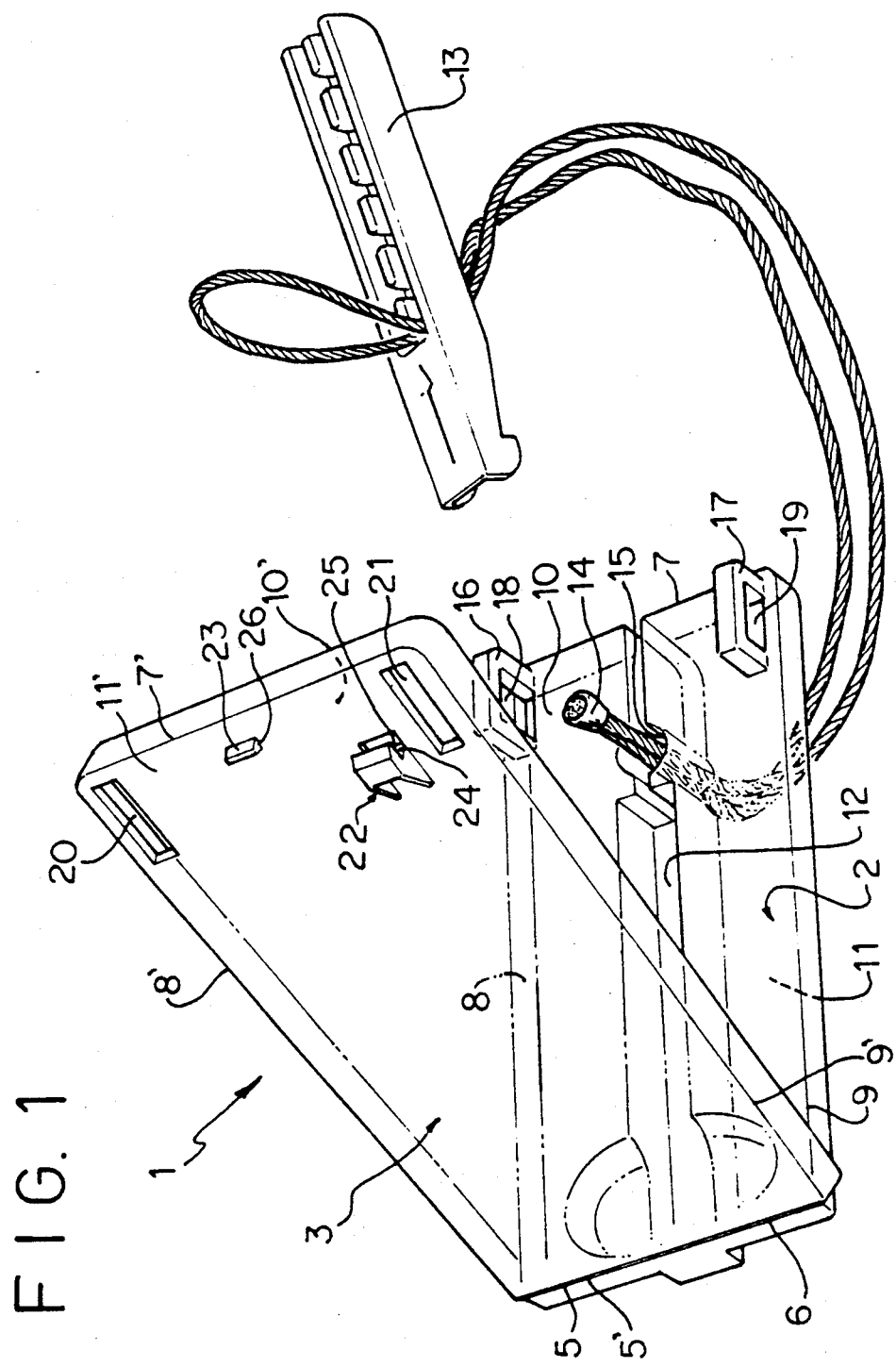
FIG. 1 is a side view of the entire clamping device.
Figure 6:
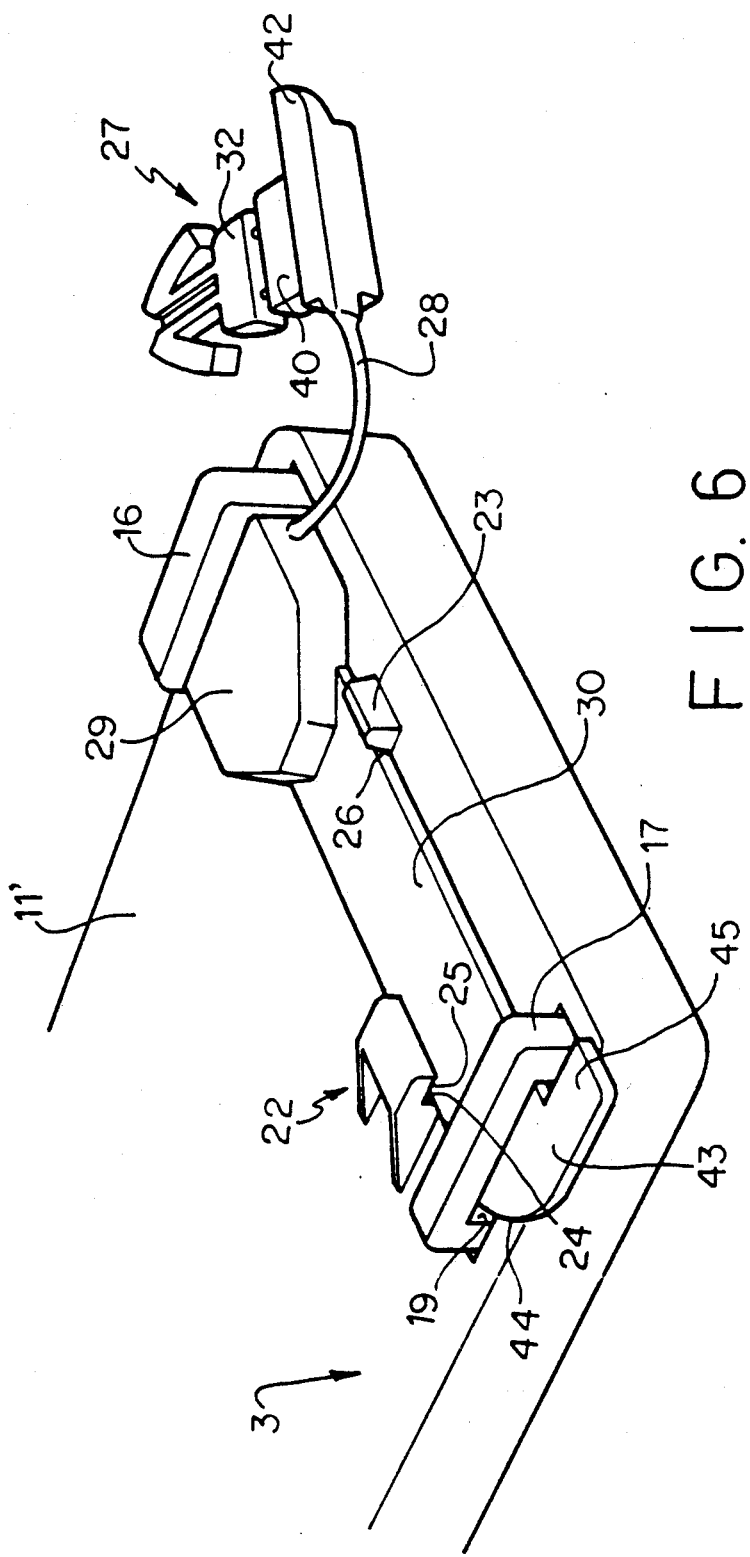
Figure 7:
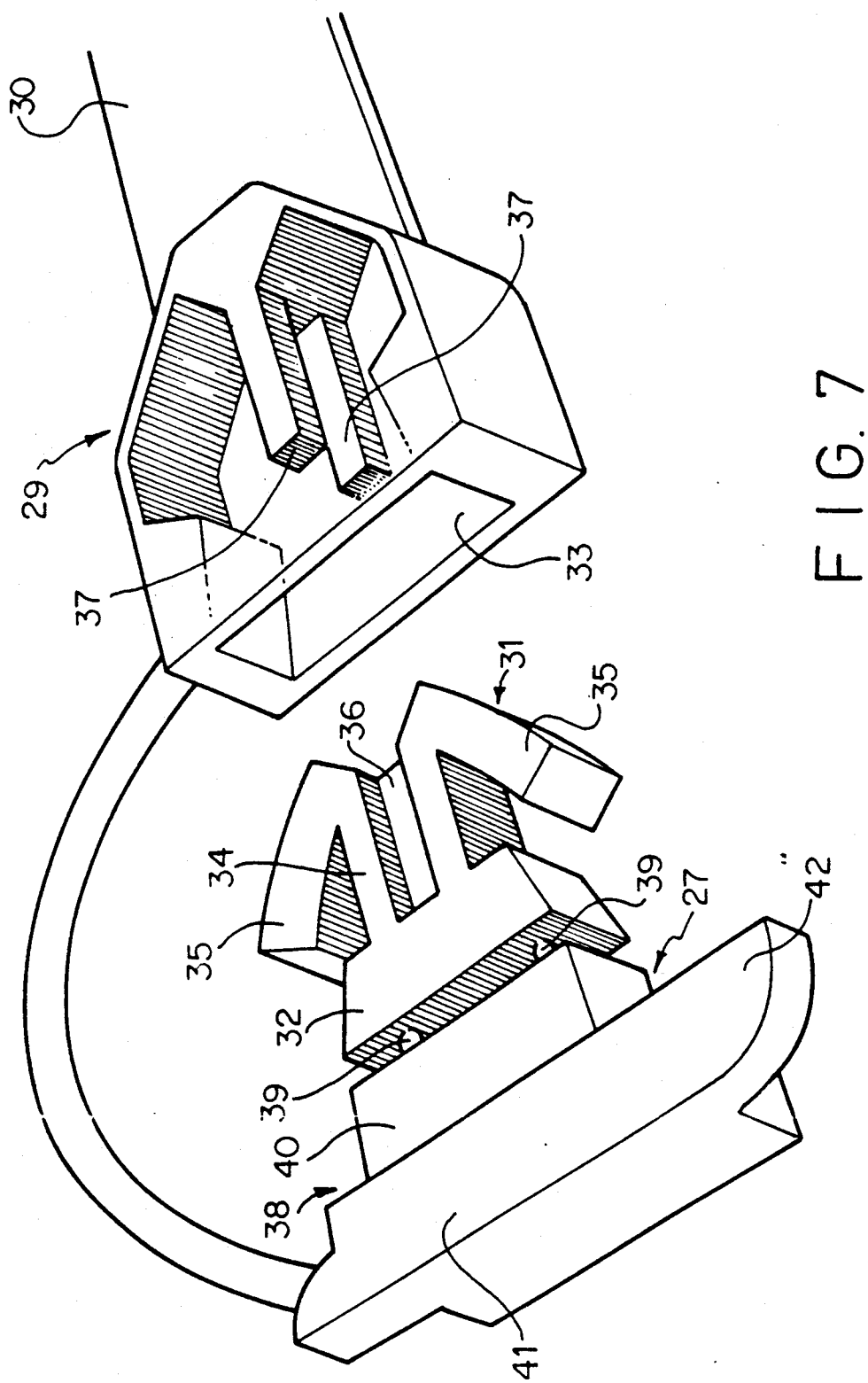
Figure 8:
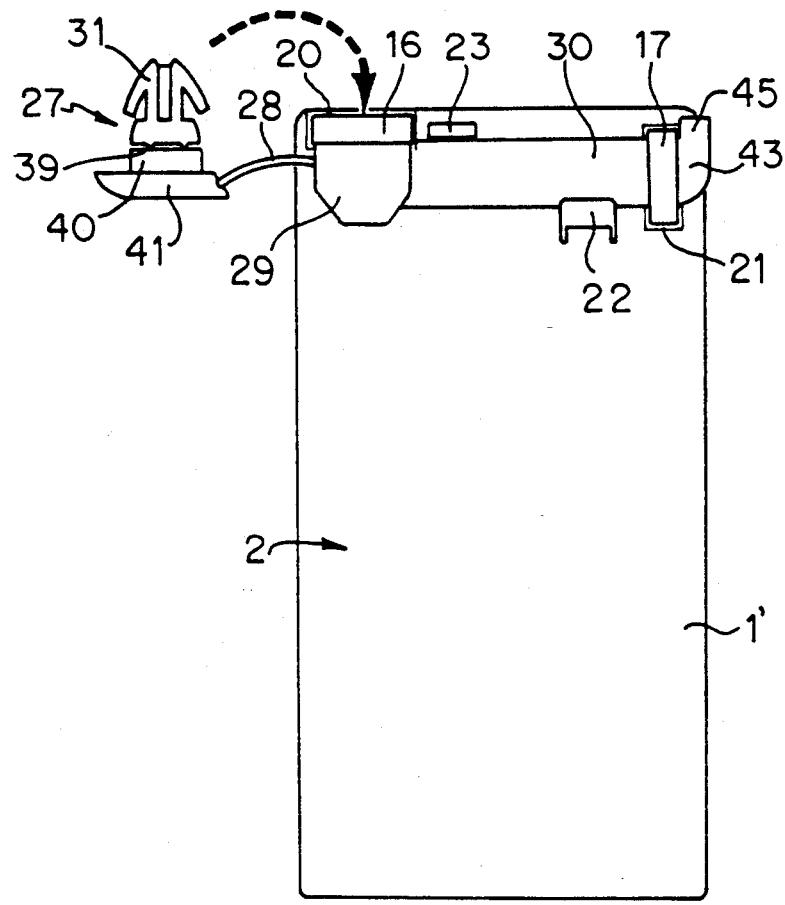
Figure 1:
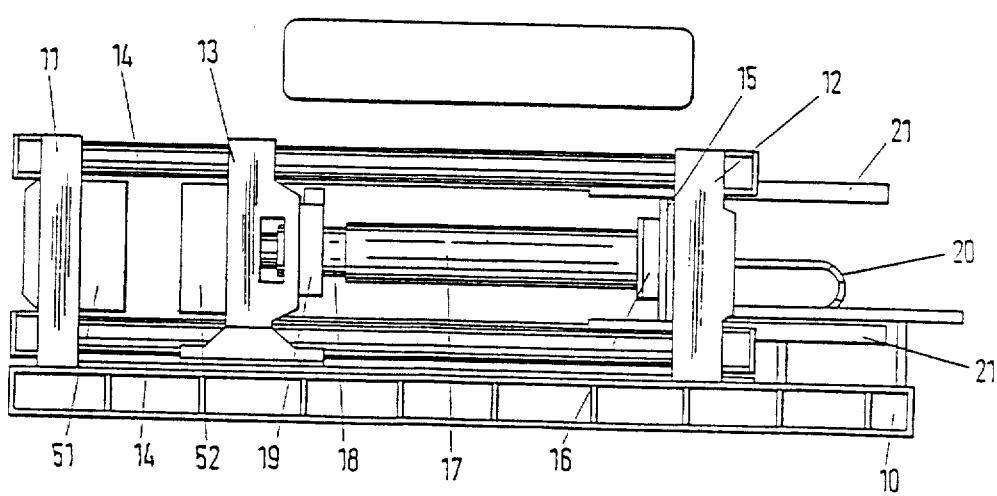

The present invention will now be described in greater detail with reference to the accompanying drawings. Referring to FIG. 1, a frame 10 is provided with two stationarily mounted and spaced plates 11 and 12 between which another plate 13 can be moved back and forth. The injection mold halves 51 and 52 are located on the opposing sides of plates 11 and 13 and can be closed to define a mold cavity for extrusion or moved away from one another in order to remove the injection molded part. This occurs along two or more tie bars 14. A pressure pad, which comprises a cylinder 15 and a piston 16, serves to carry out the squeezing stroke. Piston 16 is also designed so that a rod 17, which is firmly connected to the movable plate, can be moved axially through the internal cavity of the piston.

Figure 2:
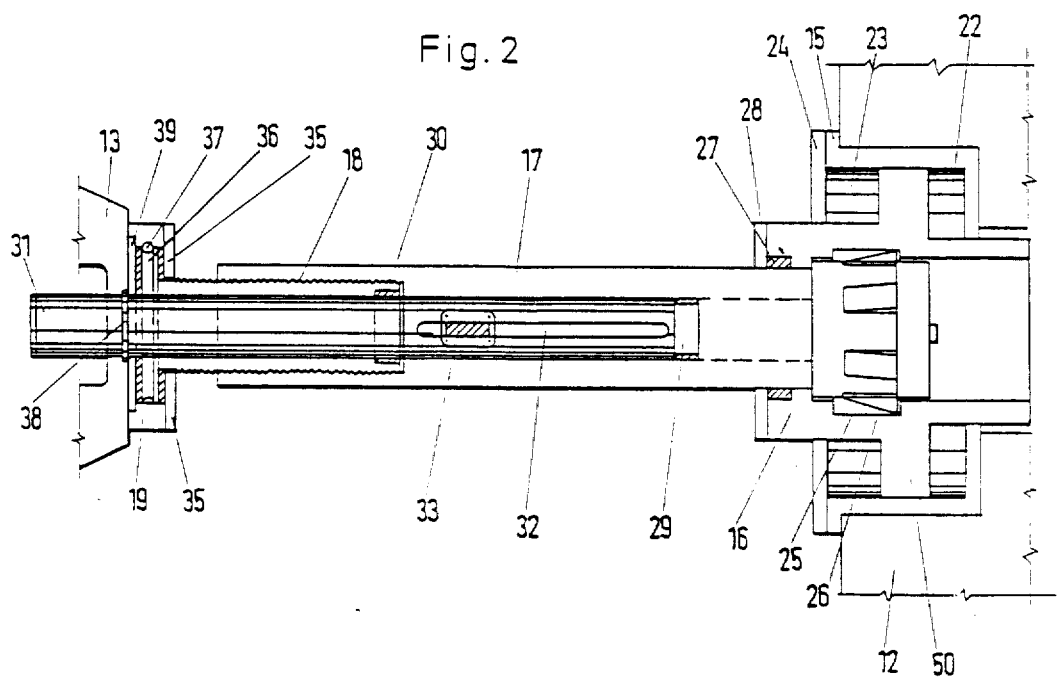
FIG. 2 is a partial view of the clamping device according to FIG. 2 with a view of the longitudinally changeable rod between the moveable plate and the second stationary plate.
Figure 3:
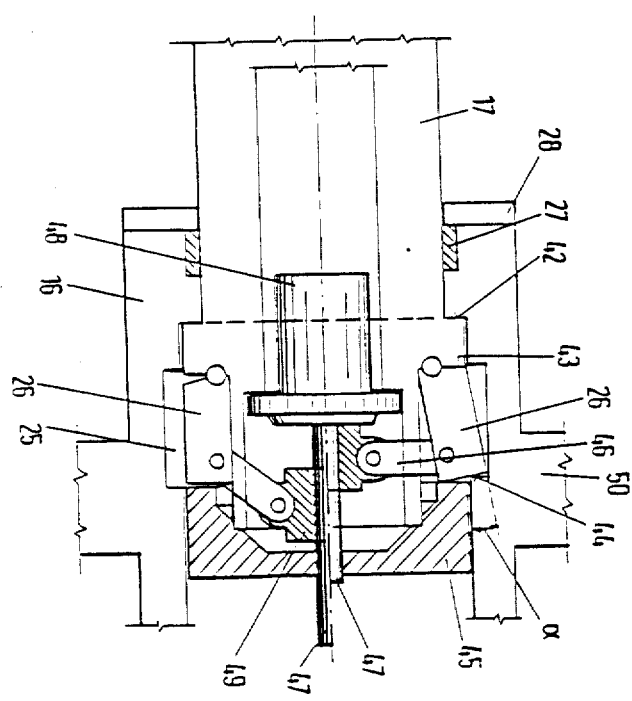
FIG. 3 is a partial view of the split flap design of the rod.
Figure 4:
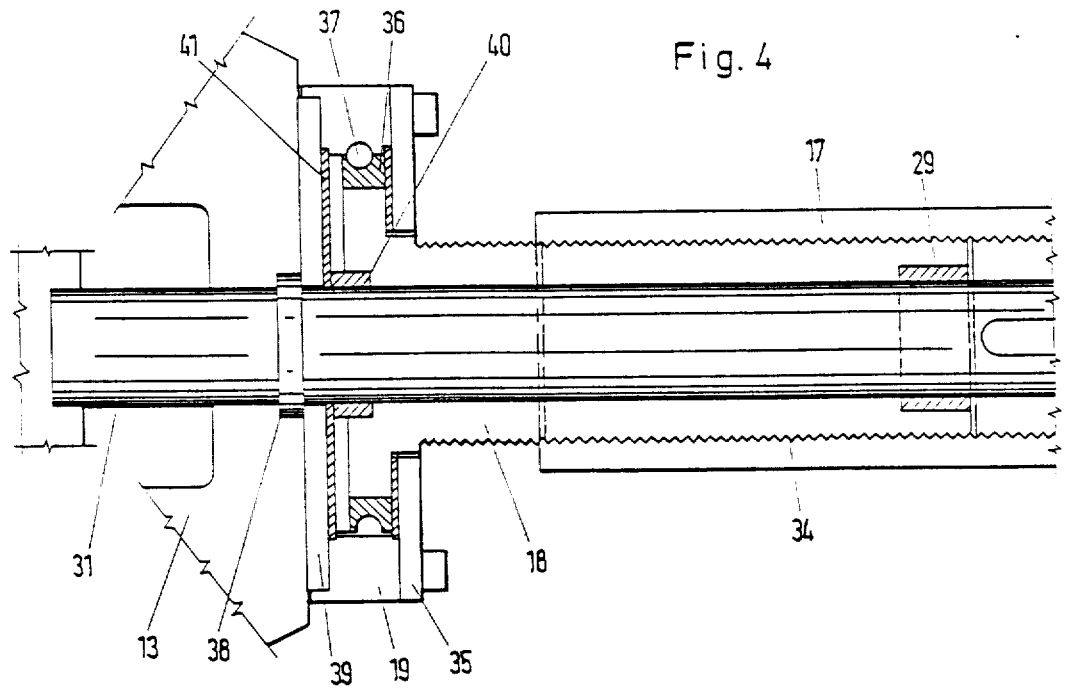
FIG. 4 shows the longitudinally changeable section of the rod with the related devices at the moveable mould carrier.

To be able to change the stroke of the pressure pad, rod 17 is designed in such a manner that its axial length can be changed. An adjusting screw 18 at one end engages an internal thread of rod 17 designed as a sleeve and at the other end with a housing 19 connected to movable plate 13. Pressure pad 15, 16 is actuated via an inflow of pressure medium 20. Drive piston 21 for accomplishing the long stroke has a separate pressure medium circulation. FIGS. 2 to 4 show the details of the longitudinally adjustable rod 17 with the split flaps.

As especially apparent from FIG. 2, cylinder 15 of the pressure pad, in which cylinder piston 16 can be moved back and forth, is mounted on the stationary plate 12. This piston has a collar 50, which divides the cylinder chamber into a first cylinder chamber 22, into which pressure medium is fed for the squeezing stroke, and a second cylinder chamber 23, into which pressure medium is fed for the return stroke or the opening. On the front side, i.e., the side facing movable plate 13, the pressure pad cylinder 15 is sealed with a cover 24.

Piston 16 is designed as a ring and has on its shell interior segmented recesses or recess designed as a ring-shaped groove 25. The recess(es) may be an annular T-slot(s). When the long stroke is completed by moving the drive piston 21 out of position, rod 17 assumes the position that is shown in FIG. 2 in which the split flaps 26 are arranged on the side of the shell and lie in the region of the recesses as the connection to movable plate 13. Rod 17 is guided in a sliding sleeve 27 of the ring piston 16. The sliding sleeve is covered or attached by means of an annular cover 28 on the front end of piston 16. Rod 17 is designed—at least on its side facing movable plate 13 as a sleeve and provided with an internal thread into which adjusting screw 18 is screwed. An internal shaft 31 is firmly connected to the movable plate and engages with rod 17 by reaching through sleeve 40 (FIG. 4) and this serves as the aligning element. Rod 17 is protected against torsion by a groove 32 located on internal shaft 31 which engaged a wedge 33 that can be driven by rod 17. The internal shaft 31 is held by means of sliding sleeves 29 and 30 in rod 17. Adjusting screw 18 has an external thread, which can be driven by a worm gear comprising a driving worm gear 35 driven by means of a hydraulic or electric motor 37 and an intermediate wheel 36. Motor 37 is arranged in the aforementioned housing 19, which is attached to the movable plate via a clamping flange 39 and clamping rings 38 and 41. A guide sleeve 40 provided in the housing serves to position internal shaft 31. To change the length of rod 17, the wedgegroove connection 32, 33 is first released, and then via the external thread 34 adjusting screw 18 is actuated at the motor via worm wheel 35 and worm spindle, which operates at an automatically locking angle or the motor has a brake.

The mechanism for actuating the split flaps is apparent from FIG. 3, wherein the upper portion shows split flap 26 in the swung-out and engaged state and the lower portion shows split flap 26 in the swung-in and disengaged state. A hydraulic cylinder 48, whose piston 47 can be moved axially with respect to rod 17, is provided to actuate the split flap. Piston 47 is connected via hinges 49—in the simplest case as a bolt connection—to a first end of a hinged arm 46, whose other end is hinged to split flap 26. The split flap that can be swung off from rod 17 has a front chamfered face 43, whose chamfering angle α is substantially equivalent to the angle of swivel shown in FIG. 3. This angle may range from 10° to 30°, and preferably ranges from 10° to 20°. By moving piston 47 into position as shown in the upper portion of FIG. 3, hinged arm 46 is placed vertically so that the front face 43 of the split flap abuts against a corresponding counter surface of rod 17. The rear face 44 then lies in the region of the rear front wall of recess 25 of pressure pad piston 16 so that when piston 16 is moved out of position, the piston stroke power is transferred to face 44, over the split flap and over the face 44 to the rod.

The return stroke, i.e., opening, is also performed by means of piston 16, and in particular in such a manner that a pressure medium is fed into piston chamber 23 so that piston 16 in FIG. 3 moves to the right. At the same time it abuts against the annular face 42 of the rod. With the transfer of power to face 42 of rod 17, face 44 of hinged flap 26 is simultaneously relieved of its stress; the hinged flap can be moved into position by a control pulse released at the same time. As shown in the lower portion of FIG. 3, this process is the result of piston 47 being moved to the right, wherein the hinged arm 46 is moved into a tilted position with flap 26 being simultaneously moved into its position out of recess 25. Rod 17 is provided on its rear end with a housing cover 45 upon whose release the swiveling device is freely accessible.

Various substitutions, modifications and improvements will be apparent to the skilled artisan without departing from the spirit and scope of the present invention as defined herein and in the following claims.

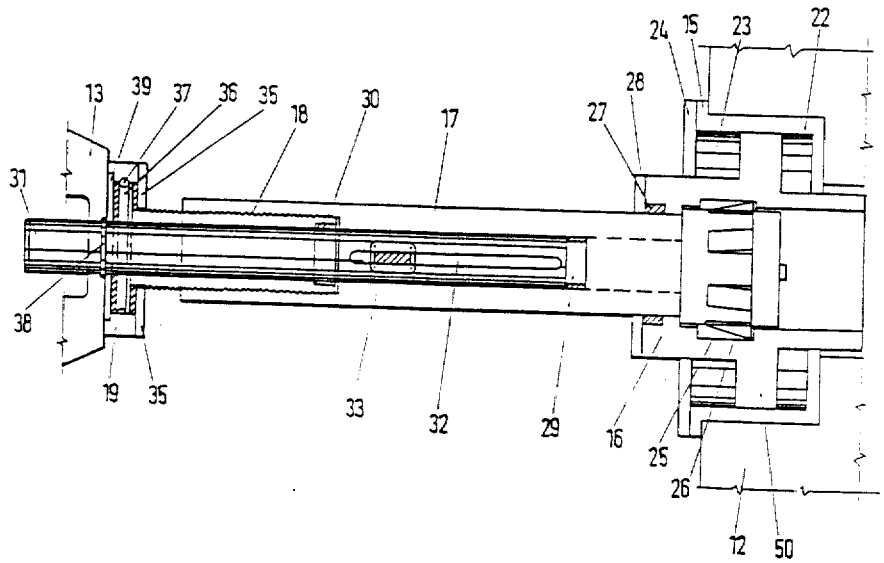

I claim:

1. A mold clamping apparatus for an injection molding machine, said mold clamping apparatus comprising at least one injection mold defined by a first injection mold half supported by a stationary plate, and a second injection old half supported by a movable plate, the movable plate being movable along the tie bars towards stand away from the stationary plate:

as piston driving chamber secured relative to a frame of the movable plate;

a ring piston located within said piston driving chamber and having an opening and closing stroke, the ring piston having at least one recess located on an inner shell thereof;

a rod connected at a first end to the movable plate and received at a second opposite end within the inner shell of said ring piston;

at least one coupling member hingeably connected to the second opposite end of said rod; and means or actuating said coupling member radially outwardly and inwardly relative to the rod to engage and disengage the recess located on the ring piston inner shell.

2. The mold clamping device according to claim 1, further comprising a plurality of recesses in the piston ring and a plurality of coupling members arranged symmetrically about the second opposite end of the rod to engage and disengage an associated recess of the plurality of recesses.

3. The mold clamping device according to claim 2, wherein the coupling members comprise split flaps hingably connected to the second opposite end o he rod via hinges, each split flap having a first surface which connects a face of its associated recess and having a second rate e which contacts an associated counter surface of said rod, whereby said ring piston can load the first face with its closing stroke force and this force is transferred to said rod via the second face.

4. The mold clamping device according to claim 3, wherein the hinges permit rotational angle of between ten and thirty degrees by the split flaps at the rod other end relative t the rod longitudinal axis, and the associated rod counter surfaces are chamfered to substantially the same angle.

5. The mold clamping device according to claim 3, wherein the hinges permit a rotational angle of between ten and twenty degrees by the split flaps at the rod other end relative to the rod longitudinal axis, and the associated rod counter surfaces are chamfered to substantially the same angle.

6. The mold clamping device according to claim 1, wherein said rod has a ring shaped shoulder located at said second opposite end which abuts said ring piston during the opening stroke of said ring piston.

7. The mold clamping device according to claim 6, wherein the coupling members exhibit a slight axial play.

8. The mold clamping device according to claim 1, wherein said actuating means comprises a hinged lever arm hingably connected at a first end to the coupling member and connected at a second end to means for driving the hinged lever arm.

9. The mold clamping device according to claim 8, wherein the coupling members exhibit a slight axial play.

10. The mold clamping device according to claim 8, wherein the said second opposite end of hinged lever arm is hingably connected to a first end of a drive piston which is driven coaxially with said ring piston.

11. The mold clamping device according to claim 10, further comprising a cover surrounding a first end of the hinge lever arm and wherein a second end of the drive piston extends through the cover to serve as a position indicator for said coupling members.

12. The mold clamping device according to claim 1, wherein the recess is an annular T-slot.

13. The mold clamping device according to claim 2, wherein six coupling members and six associated recesses are provided.

14. The mold clamping device according to claim 1, wherein said actuating means comprises an electromechanical actuator.

15. The mold clamping device according to claim 1, wherein said actuating means comprises a pneumatic actuator.

16. The mold clamping device according to claim 1, wherein said actuating means comprises a hydraulic actuator.

17. The mold clamping device according to claim 1, wherein the rod is guided in a sliding sleeve of said ring piston.

18. The mold clamping device according to claim 17, wherein the sliding sleeve comprises two ring halves.

19. The mold clamping device according to claim 17, wherein the sliding sleeve comprises a self-lubricating material.

20. The mold clamping device according to claim 1, wherein a fluid chamber is provided about said ring piston, the piston having an annular collar which divides the fluid chamber into two portions which may be alternately filled with a pressure medium to effect the opening or closing stroke of the piston.

21. The mold clamping device according to claim 1, further comprising means for adjusting the axial length of said rod.

22. The mold clamping device according to claim 21, wherein the other end of the rod comprises a sleeve having an internal thread and further comprising an adjusting screw having an external thread received at one end in the threaded sleeve and which is connected at another end to the movable plate.

23. The mold clamping device according to claim 22, further comprising a worm gear engaging the external thread of the adjusting screw and means for driving the worm gear.

24. The mold clamping device according to claim 23, wherein the driving means comprises a hydraulic motor connected to the movable plate.

25. The mold clamping device according to claim 22, further comprising an aligning inner shaft which is connected to the movable plate and is arranged concentrically within bearing sleeves located within said rod and the adjusting screw.

26. The mold clamping device according to claim 25, further comprising a wedge shaped member located on the aligning inner shaft, the wedge shaped member engaging a groove on the rod to reduce torsion of the rod.

27. The mold clamping device according to claim 1, wherein the maximum stroke of the piston is approximately 20 cm.

28. The mold clamping device according to claim 1, wherein the maximum stroke of the piston ranges from approximately 10 to 15 cm.

* * * * *

UNITED STATES PATENT AND TRADEMARK OFFICE
CERTIFICATE OF CORRECTION

PATENT NO. : 5,078,590

DATED : January 7, 1992

INVENTOR(S) : Kjell Hogseth

It is certified that error appears in the above-identified patent and that said Letters Patent is hereby corrected as shown below:

The title page showing the illustrative figure should be deleted to be replaced with the attached title page.

Sheets 1-6 of the drawings should be deleted to be replaced with sheets 1-4 of drawings, consisting of Figs. 1-4, as shown on the attached pages.

Signed and Sealed this

Sixteenth Day of June, 1992

Attest:

DOUGLAS B. COMER

*Attesting Officer*   *Acting Commissioner of Patents and Trademarks*

United States Patent [19]

Högseth

[11] Patent Number: 5,078,590

[45] Date of Patent: Jan. 7, 1992

[54] MOLD CLAMPING DEVICE FOR AN INJECTION MOLDING MACHINE

[75] Inventor: Kjell Högseth, Raufoss, Norway

[73] Assignee: Klöckner Ferromatik Desma GmbH, Malterdingen, Fed. Rep. of Germany

[21] Appl. No.: 589,806

[22] Filed: Sep. 28, 1990

[30] Foreign Application Priority Data

Oct. 6, 1989 [DE] Fed. Rep. of Germany ....... 3933348

[51] Int. Cl.⁵ ............................................. B29C 45/66
[52] U.S. Cl. ................................. 425/589; 425/451.9; 425/595
[58] Field of Search ................. 425/589, 595, 451.9, 425/444, DIG. 221

[56] References Cited

U.S. PATENT DOCUMENTS 4,797,086  1/1989  Adachi ............................... 425/589

FOREIGN PATENT DOCUMENTS

| | | |
|---|---|---|
| 806170 | 6/1951 | Fed. Rep. of Germany ...... 425/589 |
| 1729314 | 8/1967 | Fed. Rep. of Germany |
| 2020880 | 4/1970 | Fed. Rep. of Germany |
| 2102725 | 1/1971 | Fed. Rep. of Germany |
| 3434863A1 | 9/1984 | Fed. Rep. of Germany |
| 3715160A1 | 5/1987 | Fed. Rep. of Germany |
| 52-2412 | 1/1977 | Japan .................. 425/451.9 |

Primary Examiner—Timothy Heitbrink
Attorney, Agent, or Firm—Watson, Cole, Grindle & Watson

[57] ABSTRACT

A mold clamping device is provided for an injection molding machine having a stationary mold half and a movable mold half supported by a movable plate. A drive rod is connected at one end to this movable plate and is received at the other end by a driving ring piston having at least one recess within its inner shell. At least one coupling member such as a split flap is swivably connected to the other end of the rod. A suitable actuator such as a piston driven lever arm is provided to operatingly engage the coupling member with the recess, whereby the mold is clamped.

28 Claims, 4 Drawing Sheets